US010466077B2

(12) United States Patent
Okamoto

(10) Patent No.: US 10,466,077 B2
(45) Date of Patent: Nov. 5, 2019

(54) OPTICAL CONNECTION DEVICE, OPTICAL COMMUNICATION DEVICE, DISPLACEMENT DETECTION DEVICE, AND ROBOT

(71) Applicant: Seiko Epson Corporation, Tokyo (JP)

(72) Inventor: Junichi Okamoto, Fujimi (JP)

(73) Assignee: Seiko Epson Corporation (JP)

( * ) Notice: Subject to any disclaimer, the term of this patent is extended or adjusted under 35 U.S.C. 154(b) by 169 days.

(21) Appl. No.: 15/657,638

(22) Filed: Jul. 24, 2017

(65) Prior Publication Data
US 2018/0031393 A1 Feb. 1, 2018

(30) Foreign Application Priority Data

Jul. 29, 2016 (JP) .................................. 2016-149426
May 30, 2017 (JP) .................................. 2017-107105

(51) Int. Cl.
G02B 6/36 (2006.01)
G01D 5/30 (2006.01)
B25J 19/02 (2006.01)
G01B 11/26 (2006.01)
B25J 13/08 (2006.01)
G02B 6/42 (2006.01)

(52) U.S. Cl.
CPC .............. G01D 5/30 (2013.01); B25J 13/088 (2013.01); B25J 19/025 (2013.01); G01B 11/26 (2013.01); G02B 6/3604 (2013.01); G02B 6/429 (2013.01); G02B 6/4214 (2013.01)

(58) Field of Classification Search
CPC ............................ G02B 6/3604; B25J 19/025
See application file for complete search history.

(56) References Cited

U.S. PATENT DOCUMENTS

| 7,329,857 | B1 | 2/2008 | Weiss |
| 7,881,569 | B2 | 2/2011 | Zhang et al. |
| 2007/0065158 | A1 | 3/2007 | Shindou et al. |
| 2007/0274727 | A1 | 11/2007 | Haruyama et al. |
| 2008/0069495 | A1* | 3/2008 | Hirohashi ............ G02B 6/3604 385/25 |

(Continued)

FOREIGN PATENT DOCUMENTS

| JP | 60-165504 A | 8/1985 |
| JP | H05-072436 A | 3/1993 |

(Continued)

OTHER PUBLICATIONS

Extended European Search Report for Application No. EP 17 18 3491 dated Dec. 5, 2017 (8 pages).

Primary Examiner — Thanh Luu
(74) Attorney, Agent, or Firm — Harness, Dickey & Pierce, P.L.C.

(57) ABSTRACT

An optical connection device includes a light source section configured to emit light, a light guide section configured to guide the light emitted from the light source section and including an emitting section configured to emit the guided light to the outside, and a light receiving section configured to receive the light emitted from the emitting section. At least one of the light source section and the light receiving section turns around a turning axis. Therefore, a transmission distance of the light from the light source section to the light receiving section changes.

13 Claims, 11 Drawing Sheets

(56) References Cited

U.S. PATENT DOCUMENTS

| | | |
|---|---|---|
| 2008/0170356 A1 | 7/2008 | Alameh et al. |
| 2009/0295744 A1 | 12/2009 | Onishi |
| 2009/0310911 A1 | 12/2009 | Zhang et al. |
| 2010/0202782 A1 | 8/2010 | Stark |

FOREIGN PATENT DOCUMENTS

| | | |
|---|---|---|
| JP | 09-042914 A | 2/1997 |
| JP | 2003-207309 A | 7/2003 |
| JP | 2005-032110 A | 2/2005 |
| JP | 2005-284250 A | 10/2005 |
| JP | 2008-066784 A | 3/2008 |
| JP | 2010-015969 A | 1/2010 |

* cited by examiner

OPTICAL CONNECTION DEVICE, OPTICAL COMMUNICATION DEVICE, DISPLACEMENT DETECTION DEVICE, AND ROBOT

BACKGROUND

1. Technical Field

The present invention relates to an optical connection device, an optical communication device, a displacement detection device, and a robot.

2. Related Art

For example, there is known an optical connection device that is disposed in a hinge portion of a door of an automobile and enables optical communication between the door and a main body of the automobile (see JP-A-2005-32110 (Patent Literature 1)). The optical connection device disclosed in Patent Literature 1 includes a main-body-side light emitting diode and a main-body-side photodiode disposed on the main body side of a hinge of the automobile and a door-side light emitting diode and a door-side photodiode disposed on the door side of the hinge. The door-side photodiode receives light emitted from the main-body-side light emitting diode. The main-body-side photodiode receives light emitted from the door-side light emitting diode.

However, in the optical connection device disclosed in Patent Literature 1, a communication section on the main body side including the main-body-side light emitting diode and the main-body-side photodiode and a communication section on the door side including the door-side light emitting diode and the door-side photodiode have to be disposed on a turning axis of the hinge portion. Therefore, for example, disposition of other components is greatly limited and flexibility of design is deteriorated.

SUMMARY

An advantage of some aspects of the invention is to provide an optical connection device, an optical communication device, a displacement detection device, and a robot that can reduce deterioration in flexibility of disposition.

The advantage can be realized by the following configurations.

An optical connection device according to an aspect of the invention includes: a first member; a second member disposed to be capable of turning around a turning axis with respect to the first member; a light source section fixed to one of the first member and the second member and configured to emit light; a light guide section fixed to the first member or the second member, configured to guide the light emitted from the light source section, and including an emitting section configured to emit the guided light to an outside; and a light receiving section fixed to the other of the first member and the second member and configured to receive the light emitted from the emitting section. At least one of the light source section and the light receiving section is capable of turning around the turning axis.

With this configuration, since a transmission distance of the light from the light source section to the light receiving section changes, flexibility of the shape of the light guide section is improved. It is possible to obtain the optical connection device that can reduce deterioration in flexibility of disposition.

In the optical connection device according to the aspect of the invention, it is preferable that the light guide section has an arcuate shape.

With this configuration, for example, it is possible to dispose the light guide section avoiding a turning axis of a target object on which the optical connection device is disposed. Therefore, it is possible to further reduce the deterioration in flexibility of disposition.

In the optical connection device according to the aspect of the invention, it is preferable that at least one of the light source section and the light receiving section and the light guide section are disposed in a plane perpendicular to the turning axis.

With this configuration, for example, it is possible to realize a small optical connection device.

In the optical connection device according to the aspect of the invention, it is preferable that the light guide section includes a circumferential section configured to surround the emitting section, and a refractive index of the emitting section is smaller than a refractive index of the circumferential section.

With this configuration, the configuration of the emitting section is simplified.

In the optical connection device according to the aspect of the invention, it is preferable that the light guide section includes a circumferential section configured to surround the emitting section, and surface roughness of the emitting section is larger than surface roughness of the circumferential section.

With this configuration, the configuration of the emitting section is simplified.

In the optical connection device according to the aspect of the invention, it is preferable that a plurality of the light source sections and a plurality of the light receiving sections are provided.

With this configuration, it is possible to transmit a plurality of lights in the light guide section.

In the optical connection device according to the aspect of the invention, it is preferable that the plurality of light source sections respectively emit lights having different wavelengths.

With this configuration, it is possible to transmit a plurality of lights in the light guide section and receive the lights in the light receiving sections exclusive for the lights.

An optical communication device according to an aspect of the invention includes the optical connection device according to the aspect of the invention explained above.

With this configuration, it is possible to obtain the optical communication device having high reliability.

A displacement detection device according to an aspect of the invention includes the optical connection device according to the aspect explained above.

Consequently, it is possible to obtain the displacement detection device having high reliability.

A robot according to an aspect of the invention including: a first arm; a second arm disposed to be capable of turning around a turning axis with respect to the first arm; a light source section fixed to one of the first arm and the second arm and configured to emit light; a light guide section fixed to the first arm or the second arm, configured to guide the light emitted from the light source section, and including an emitting section configured to emit the guided light to an outside; and a light receiving section fixed to the other of the first arm and the second arm and configured to receive the light emitted from the emitting section. At least one of the light source section and the light receiving section is capable of turning around the turning axis.

With this configuration, it is possible to obtain the robot that can reduce deterioration in flexibility of disposition.

In the robot according to the aspect of the invention, it is preferable that the robot further includes a base section configured to support the first arm, and the light source section, the light guide section, and the light receiving section are respectively disposed in the first arm.

With this configuration, it is possible to reduce the weight of the second arm and secure a space in the second arm.

In the robot according to the aspect of the invention, it is preferable that the robot further includes a base section configured to support the first arm. The light source section, the light guide section, and the light receiving section are respectively disposed in the second arm.

With this configuration, it is possible to reduce the weight of the first arm and secure a space in the first arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

An optical connection device, an optical communication device, a displacement detection device and a robot according to the invention are explained in detail below with reference to preferred embodiments illustrated in the appended drawings.

First Embodiment

First, an optical connection device according to a first embodiment of the invention is explained.

Figure 1:
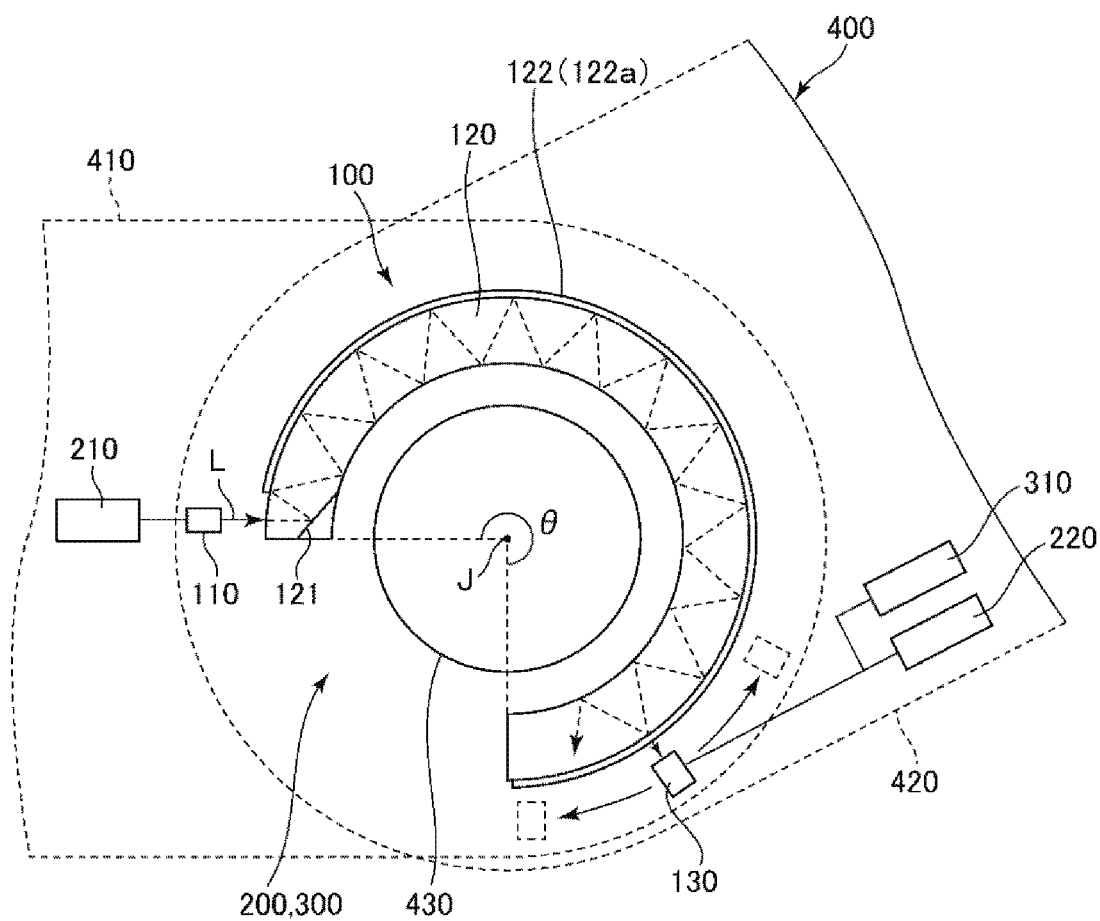
FIG. 1 is a plan view showing an optical connection device according to a first embodiment of the invention.
Figure 2:
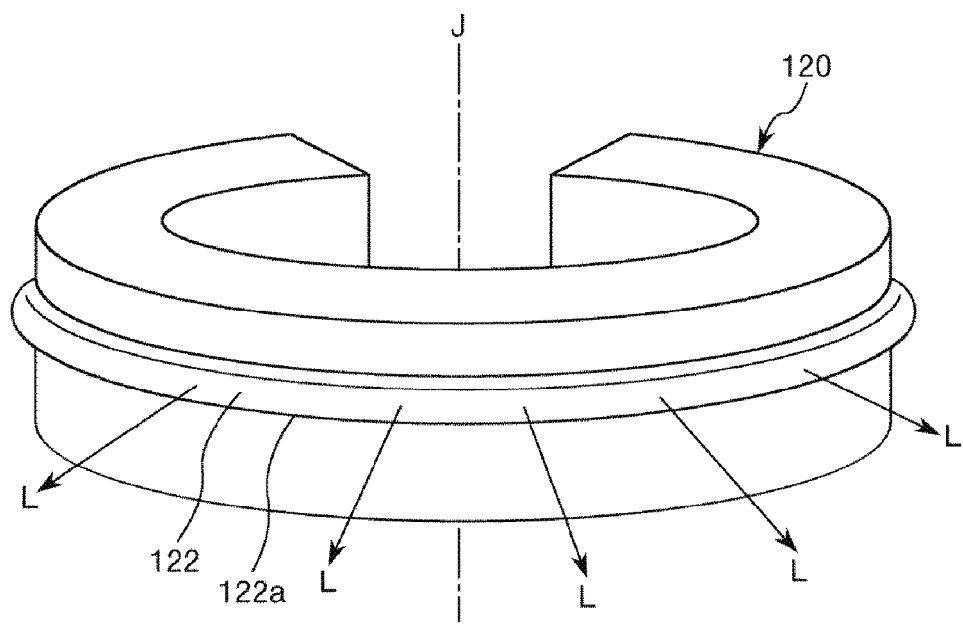
FIG. 2 is a perspective view of a light guide section included in the optical connection device shown in FIG. 1.
Figure 3:
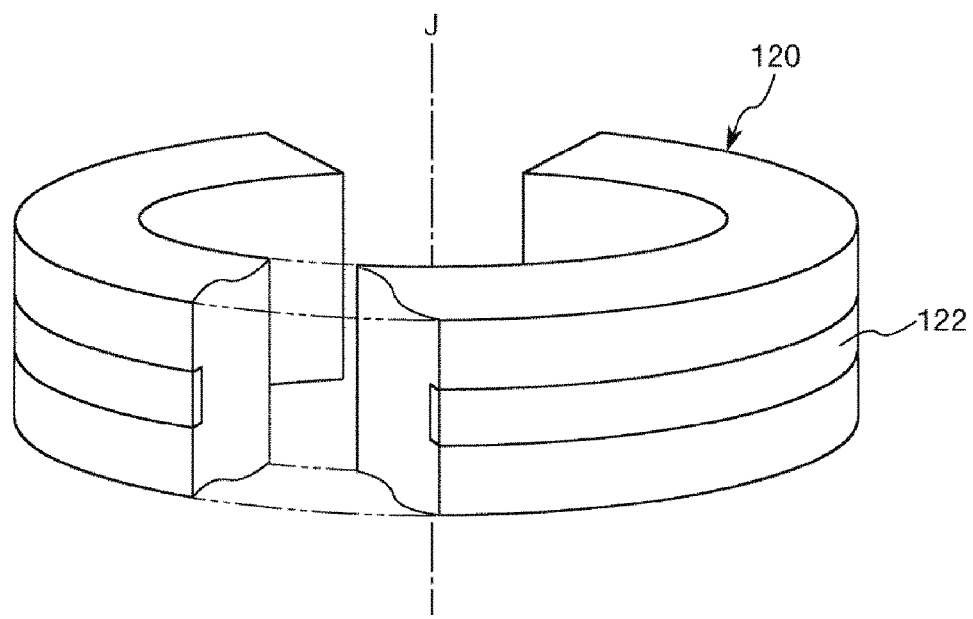
FIG. 3 is a perspective view showing a modification of the light guide section shown in FIG. 2.
Figure 4:
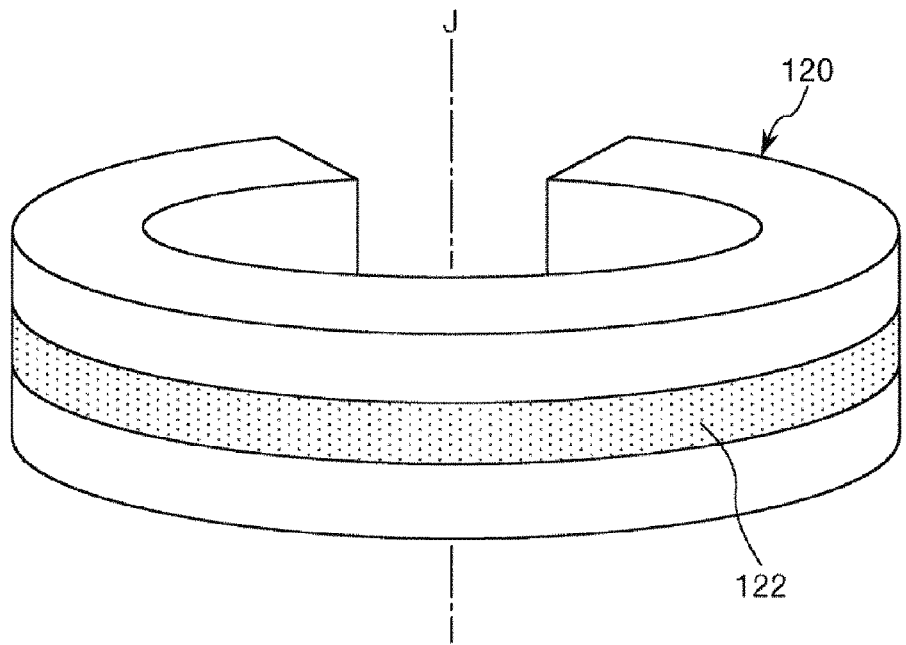
FIG. 4 is a perspective view showing a modification of the light guide section shown in FIG. 2.
Figure 5:
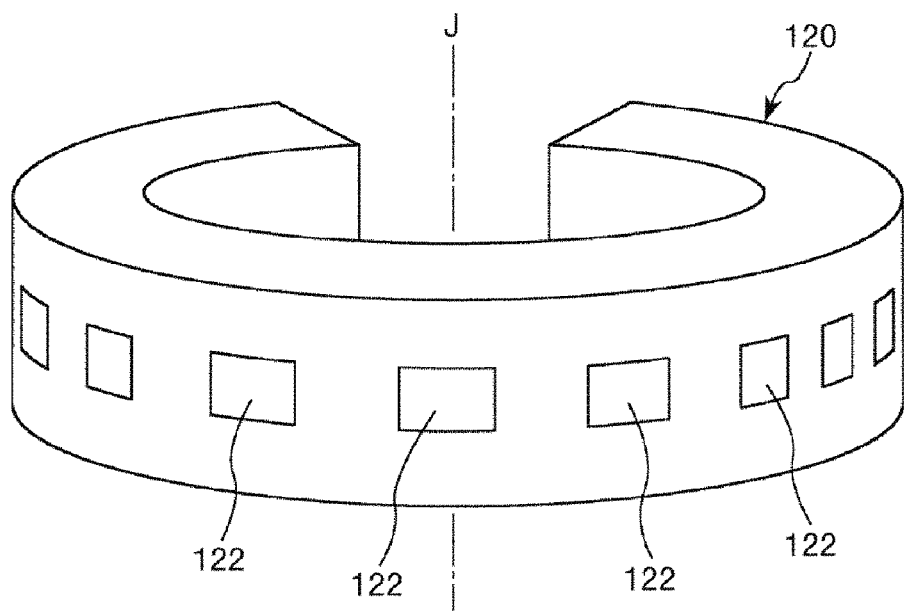
FIG. 5 is a perspective view showing a modification of the light guide section shown in FIG. 2.
Figure 6:
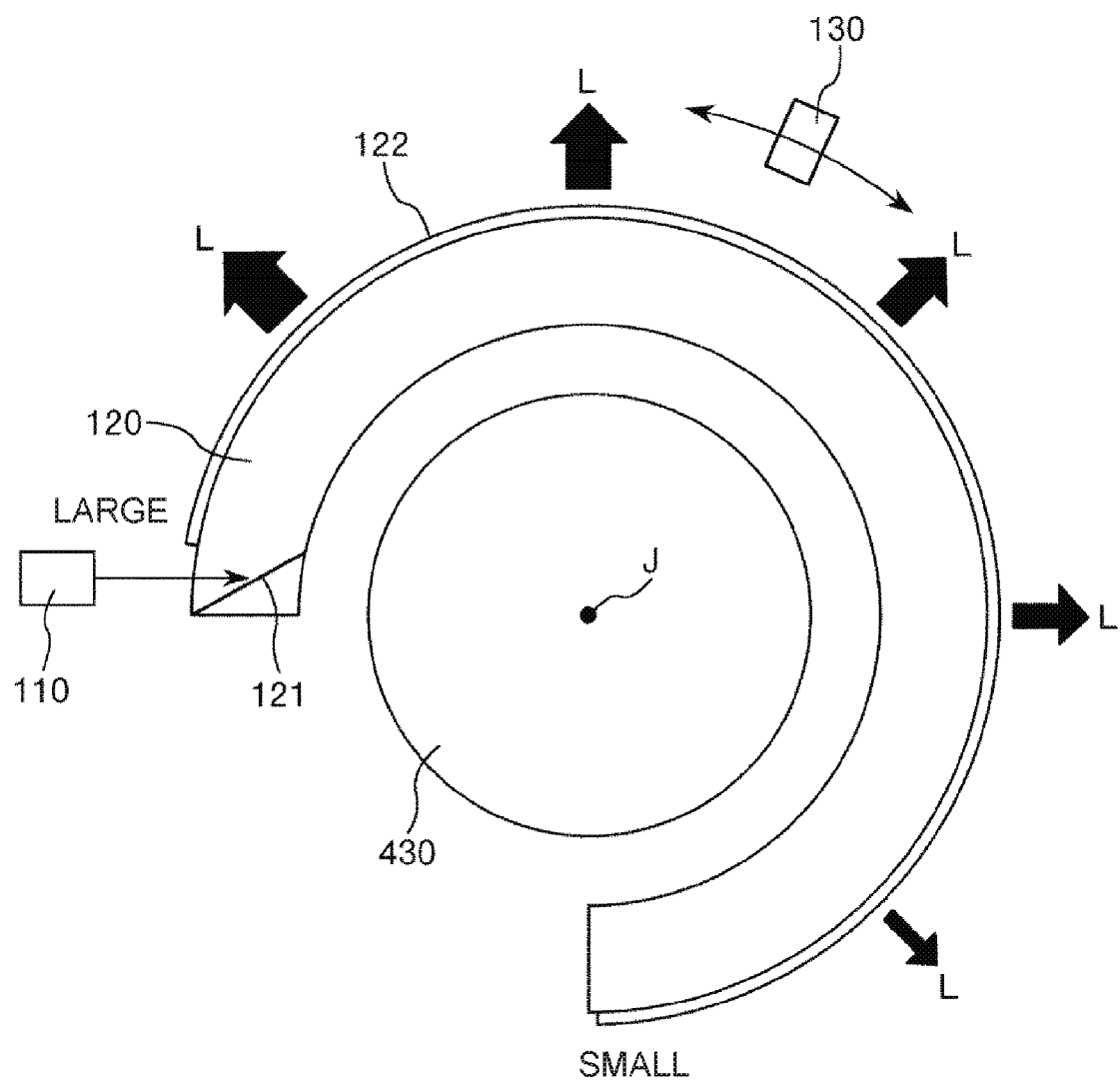
FIG. 6 is a plan view for explaining characteristics of the light guide section.

FIG. 1 is a plan view showing the optical connection device according to the first embodiment of the invention. FIG. 2 is a perspective view of a light guide section included in the optical connection device shown in FIG. 1. FIGS. 3 to 5 are respectively perspective views showing modifications of the light guide section shown in FIG. 2. FIG. 6 is a plan view for explaining characteristics of the light guide section.

An optical connection device 100 shown in FIG. 1 includes a light source section 110 that emits light L, a light guide section 120 that guides the light emitted from the light source section 110 and includes an emitting section 122 that emits the guided light L to the outside, and a light receiving section 130 that receives the light L emitted from the emitting section 122. At least one of the light source section 110 and the light receiving section 130 and the light guide section 120 are capable of relatively turning around a turning axis J. In the optical connection device 100 having such a configuration, a transmission distance (an optical path length) of the light L from the light source section 110 to the light receiving section 130 changes because at least one of the light source section 110 and the light receiving section 130 is displaced with respect to the light guide section 120. Therefore, flexibility of the shape of the light guide section 120 is improved. Consequently, when the optical connection device 100 is incorporated in a target object (e.g., a device 400 explained below), it is possible to reduce deterioration in flexibility of disposition of other components (likelihood that a space for disposing the other components cannot be secured). Since a space in the device 400 can be effectively utilized, it is possible to achieve a reduction in the size of the device 400. The optical connection device 100 incorporated in the device 400 is explained in detail below.

As shown in FIG. 1, the device 400 includes a first member 410 and a second member 420 connected to the first member 410 and capable of turning around the turning axis J with respect to the first member 410. A driving source 430 for turning the second member 420 around the turning axis J is disposed in the first member 410. The first member 410 and the second member 420 are, for example, robot arms or boards. The driving source 430 is, for example, a motor and is disposed such that a rotating shaft of the driving source 430 coincides with the turning axis J. The device 400 can be applied to, for example, a robot 1000 explained below. Note that the driving source 430 may include a reduction gear or the like in addition to the motor. The driving source 430 may be omitted. When the driving source 430 is omitted, the device 400 can be applied to a hinge portion of a door (a window) or a lid.

As shown in FIG. 1, the optical connection device 100 incorporated in the device 400 is disposed (housed) in the first member 410. The optical connection device 100 functions as both of main parts of an optical communication device 200 that performs optical communication between the first member 410 and the second member 420 and a displacement detection device 300 (an encoder) that detects a displacement amount (a turning angle around the turning axis J) of the second member 420 with respect to the first member 410. That is, the optical connection device 100 functions as both of the main parts of the optical communication device 200 and the displacement detection device 300. The optical communication device 200 includes, in addition to the optical connection device 100, a transmitting section 210 that controls the light source section 110 to thereby convert an electric signal into an optical signal (a pulse signal by flashing of light) and a receiving section 220 that generates an electric signal on the basis of the optical signal received by the light receiving section 130. On the other hand, the displacement detection device 300 includes, in addition to the optical connection device 100, a detecting section 310 that detects a turning angle of the second member 420 around the turning axis J on the basis of the intensity of the light (the optical signal) received by the light receiving section 130.

As explained above, the optical connection device 100 includes the light source section 110 that emits the light L, the light guide section 120 that transmits (guides) the light L emitted from the light source section 110 and includes the emitting section 122 that emits the transmitted light L to the outside, and the light receiving section 130 that receives the light L emitted from the emitting section 122. The light source section 110 and the light guide section 120 are respectively fixed to the first member 410. On the other hand, the light receiving section 130 is fixed to the second member 420 and turns around the turning axis J with respect to the first member 410 according to the turning of the second member 420. Therefore, when the second member 420 turns with respect to the first member 410, the light receiving section 130 turns (is displaced) with respect to the light source section 110 and the light guide section 120.

The light source section 110 is not particularly limited as long as the light source section 110 can emit the light L. For example, a light emitting diode (LED) and a semiconductor laser (LD) can be used as the light source section 110. A wavelength of the light L is not particularly limited either. The light L may be visible light or may be invisible light (e.g., infrared light).

The light guide section 120 is formed in a shape of a curved line extending around a circumference surrounding the turning axis J in a plan view from an extending direction of the turning axis J. The light guide section 120 includes an inner circumferential surface (a surface facing the inner side) present on a side close to the turning axis J and an outer circumferential surface (a surface facing the outer side) present on a side far from the turning axis J. By forming the light guide section 120 in such a shape, it is possible to dispose the light guide section 120 around the driving source 430 avoiding the driving source 430 including the turning axis J. Therefore, the disposition of the driving source 430 is not hindered by the light guide section 120. It is possible to effectively reduce deterioration in flexibility of disposition of components in the device 400. In particular, in this embodiment, the light guide section 120 is formed in an arcuate shape in a plan view from the extending direction of the turning axis J. The center axis of the light guide section 120 coincides with the turning axis J. On the other hand, the light receiving section 130 turns around the turning axis J (the center axis of the light guide section 120) according to the turning of the second member 420. Therefore, since the light guide section 120 is formed in an arcuate shape having the turning axis J as the center axis, the light receiving section 130 is displaced along the light guide section 120 according to the turning of the second member 420. Therefore, irrespective of the position of the light receiving section 130, it is possible to receive, with the light receiving section 130, the light L transmitted in the light guide section 120 and emitted from the emitting section 122. Since the light guide section 120 can be disposed avoiding the turning axis J, disposition of the driving source 430 is not hindered by the light guide section 120. It is also possible to more effectively reduce the deterioration in flexibility of disposition of components in the device 400. If a part (e.g., the rotating shaft) of the driving source 430 is disposed between the turning axis J and the light guide section 120 in a sectional view including the turning axis J, it is possible to reduce the device 400 in size in a direction in which the turning axis J extends.

Note that the shape of the light guide section 120 is not limited to a perfect arcuate shape. The light guide section 120 may be partially formed in an arcuate shape or may include, for example, a bent shape or a linear shape. The curvature radius of the light guide section 120 is desirably fixed along an extending direction of the light guide section 120. However, the light guide section 120 may include portions having curvature radiuses different from each other, for example, curvature radiuses changing in the extending direction. At least one of the inner circumferential surface and the outer circumferential surface of the light guide section 120 may be formed by connecting a plurality of flat surfaces in an arcuate shape.

The shape of the outer circumferential surface of the light guide section 120 is not limited to a curved surface and may be, for example, a surface obtained by connecting a plurality of flat surfaces in an arcuate shape.

The light guide section 120 includes an incident section 121 that is located at one end portion in the extending direction (the circumferential direction), receives incidence of the light L from the light source section 110, and guides the incident light L into the light guide section 120. The incident section 121 may have, for example, a reflection surface. The reflection surface may be a metal reflection surface or a reflection surface by multilayer lamination of optical thin films. As shown in FIG. 1, the light source section 110 is disposed to be opposed to the outer circumferential surface (the incident section 121) of the light guide section 120. That is, the light guide section 120 is disposed between the turning axis J and the light source section 110. Consequently, it is possible to reduce the device 400 in size in the extending direction of the turning axis J. The light source section 110 and the light guide section 120 are desirably disposed in a plane perpendicular to the turning axis J. The light L emitted from the light source section 110 is guided from the incident section 121 into the light guide section 120 and transmitted in the light guide section 120 while repeating reflection or refraction in the light guide section 120. As shown in FIG. 2, the light guide section 120 includes the emitting section 122 that is located on the outer circumferential surface (a side surface facing the outer side) of the light guide section 120 and emits a part of the light L transmitted in the light guide section 120 to the outside of the light guide section 120. The emitting section 122 is configured by a convex ridge 122a (a protrusion) extending along an extending direction (the circumferential direction) of the outer circumferential surface of the light guide section 120. The light L is made incident on the convex ridge 122a at an angle exceeding a critical angle, whereby the light L is emitted from the convex ridge 122a to the outside of the light guide section 120.

Note that the configuration of the emitting section 122 is not particularly limited as long as the emitting section 122 can emit the light L transmitted in the light guide section 120 to the outside. For example, the emitting section 122 may be configured by a concave ridge (a groove) extending in the circumferential direction or may have a configuration in which a plurality of protrusions are disposed side by side in the circumferential direction (unevenness is formed along the circumferential direction). For example, as shown in FIG. 3, when the emitting section 122 is configured by a body different from the light guide section 120 and a portion of the light guide section 120 surrounding the emitting section 122 (present around the emitting section 122) is set as a circumferential section, the emitting section 122 may be configured such that the refractive index of the emitting section 122 is smaller than the refractive index of the circumferential section (the refractive index of the light guide section 120). With such a configuration, the configuration of the emitting section 122 is simplified. For example, as shown in FIG. 4, when a portion of the light guide section 120 surrounding the emitting section 122 (present around the emitting section 122) is set as a circumferential section, the emitting section 122 may be configured such that surface roughness Ra of the emitting section 122 is larger than the surface roughness Ra of the circumferential section. With such a configuration as well, the configuration of the emitting section 122 is simplified. Since the emitting section 122 can be configured integrally with the light guide section 120, it is easy to manufacture the emitting section 122. Note that the surface roughness Ra can be measured according to JIS B0601.

The disposition of the emitting section 122 is not particularly limited either as long as the emitting section 122 can emit the light L transmitted in the light guide section 120 to the outside. For example, the emitting section 122 may be disposed on an upper surface or a lower surface (one of two surfaces present side by side along the extending direction of the turning axis J) of the light guide section 120 or may be disposed on the inner circumferential surface of the light guide section 120. However, when the emitting section 122 is disposed on the outer circumferential surface of the light guide section 120 as in this embodiment, there is an advantage that it is easy to secure a disposition space for the light receiving section 130 compared with when the emitting section 122 is disposed in another portion.

In this embodiment, the emitting section 122 is continuously disposed in a belt shape along the circumferential direction on the outer circumferential surface of the light guide section 120. However, as shown in FIG. 5, a plurality of the emitting sections 122 may be intermittently disposed along the circumferential direction. In this case, for example, a clearance between adjacent two emitting sections 122 may be fixed or may gradually decrease or gradually increase along a direction away from the incident section 121.

The light guide section 120 has a C shape formed by cutting a part of a ring. By forming the light guide section 120 in such a shape, for example, it is possible to insert a component such as a wire into a space on the inner side of the light guide section 120 from the cut portion. Therefore, it is easy to assemble the device 400. It is possible to easily effectively utilize the space on the inner side of the light guide section 120. Note that a center angle θ of the light guide section 120 is not particularly limited. However, for example, the center angle θ is desirably 180° or more and less than 360° and more desirably 270° or more and 350° or less. By setting the center angle θ in this way, it is possible to exhibit the effects explained above and secure a sufficiently large detectable range of the displacement detection device 300. However, the shape of the light guide section 120 is not limited to the C shape and may be, for example, a ring shape having the center angle θ of 360° or may be a spiral shape having the center angle θ larger than 360°.

As shown in FIG. 1, the light receiving section 130 is disposed to be opposed to the outer circumferential surface (the emitting section 122) of the light guide section 120 to receive the light L emitted from the emitting section 122. That is, the light guide section 120 is disposed between the turning axis J and the light receiving section 130. Consequently, it is possible to reduce the device 400 in size in the direction in which the turning axis J extends. The light receiving section 130 and the light guide section 120 are desirably disposed in a plane orthogonal to the turning axis J. The light receiving section 130 is not particularly limited as long as the light receiving section 130 can receive the light L. For example, a photodiode can be used as the light receiving section 130.

Since the outer circumferential surface of the light guide section 120 is formed in the arcuate shape as explained above, even if the light receiving section 130 turns around the turning axis J with respect to the light guide section 120, it is possible to keep the clearance between the light guide section 120 (the emitting section 122) and the light receiving section 130 constant. That is, irrespective of the position of the light receiving section 130, it is possible to keep the clearance between the light guide section 120 (the emitting section 122) and the light receiving section 130 constant. Therefore, irrespective of the position of the light receiving section 130, it is possible to keep a loss of the light L substantially constant from the emission by the emitting section 122 until the reception by the light receiving section 130. The displacement detection device 300 can more accurately detect the turning angle of the second member 420.

A constituent material of the light guide section 120 is not particularly limited as long as the light guide 120 section can guide the light L. However, various resin materials such as acrylic resin, epoxy resin, and polyester resin can be used as the constituent material. As indicated by the principle of an optical fiber including a core and a clad, a material obtained by combining two kinds of materials having different refractive indexes can also be used. Consequently, it is possible to reduce a loss of the light L when the light L is transmitted in the light guide section 120.

The optical connection device 100 is explained above. The operations of the optical communication device 200 and the displacement detection device 300 including the optical connection device 100 are explained below.

The optical communication device 200 performs communication according to flashing of the light L. First, the optical communication device 200 converts a received electric signal into optical signal information (pulse signal information) in the transmitting section 210, drives the light source section 110 on the basis of the converted optical signal information to flash the light L, and emits the light L in a pulse shape to generate an optical signal. The emitted light L is guided from the incident section 121 into the light guide section 120 and transmitted in the light guide section 120 while apart of the light L is emitted from the emitting section 122. The light receiving section 130 receives the light L emitted from a position opposed to the light receiving section 130 in the emitting section 122. The receiving section 220 generates an electric signal on the basis of the light L (the optical signal) received by the light receiving section 130. Consequently, the electric signal transmitted to the transmitting section 210 is restored by the receiving section 220. As explained above, the optical communication device 200 performs the optical communication between the first member 410 and the second member 420. With the optical communication device 200, since the optical communication device 200 includes the optical connection device 100, it is possible to enjoy the effects of the optical connection device 100 explained above and exhibit high reliability.

On the other hand, the displacement detection device 300 (the encoder) detects the turning angle of the second member 420 on the basis of the intensity (the brightness) of the light L received by the light receiving section 130. The light L emitted from the light source section 110 is guided from the incident section 121 into the light guide section 120 and transmitted in the light guide section 120 while a part of the light L is emitted from the emitting section 122. Therefore, as shown in FIG. 6, the intensity of the light L emitted from the emitting section 122 is larger closer to the incident section 121 of the light guide section 120 and is smaller further away from the incident section 121. That is, the intensity of the light L emitted from the emitting section 122 gradually decreases in a direction away from the incident section 121. The detecting section 310 detects the position of the light receiving section 130 with respect to the light guide section 120 from the intensity of the light L received by the light receiving section 130 making use of this property and detects the turning angle of the second member 420 on the basis of the position. With the displacement detection device 300, since the displacement detection device 300 includes the optical connection device 100, it is possible to enjoy the effects of the optical connection device 100 explained above and exhibit high reliability.

As explained above, the optical connection device 100 can exhibit an effect that the optical connection device 100 can function as both of the main parts of the optical communication device 200 and the displacement detection device 300. Therefore, it is possible to reduce the number of components and reduce a disposition space compared with when the optical communication device 200 and the displacement detection device 300 are separately provided. As a result, it is possible to achieve a reduction in the size of the device 400.

The optical connection device 100 in the first embodiment is explained above. Note that, in this embodiment, the optical connection device 100 is configured such that the light source section 110 is fixed to the light guide section 120 and the light receiving section 130 is displaced with respect to the light guide section 120, whereby the transmission distance (the optical path length) of the light L from the light source section 110 to the light receiving section 130 changes. However, conversely, the optical connection device 100 may be configured such that the light receiving section 130 is fixed to the light guide section 120 and the light source section 110 is displaced with respect to the light guide section 120, whereby the transmission distance of the light L from the light source section 110 to the light receiving section 130 changes. The optical connection device 100 may be configured such that both of the light source section 110 and the light receiving section 130 are displaced with respect to the light guide section 120, whereby the transmission distance of the light L from the light source section 110 to the light receiving section 130 changes. However, when the light source section 110 is displaced with respect to the light guide section 120, the configuration of the incident section 121 is likely to be complicated. Therefore, from this viewpoint, as in this embodiment, it is desirable that the light source section 110 is fixed to the light guide section 120 and the light receiving section 130 is displaced with respect to the light guide section 120.

In this embodiment, the configuration is explained in which the light source section 110 is disposed in the vicinity of the light guide section 120. However, the disposition of the light source section 110 is not particularly limited as long as the light L can be guided to the light guide section 120. For example, a configuration may be adopted in which the light source section 110 is disposed in a place apart from the light guide section 120, the light L emitted from the light source section 110 is guided to the vicinity of the light guide section 120 via a light guide member such as an optical fiber, and light emitted from the light guide member is made incident on the light guide section 120. The same applies to the disposition of the light receiving section 130. A configuration may be adopted in which the light receiving section 130 is disposed in a place apart from the light guide section 120, the light L emitted from the emitting section 122 is guided to the vicinity of the light receiving section 130 via a light guide member such as an optical fiber, the light receiving section 130 receives light emitted from the light guide member.

Second Embodiment

An optical connection device according to a second embodiment of the invention is explained.

Figure 7:
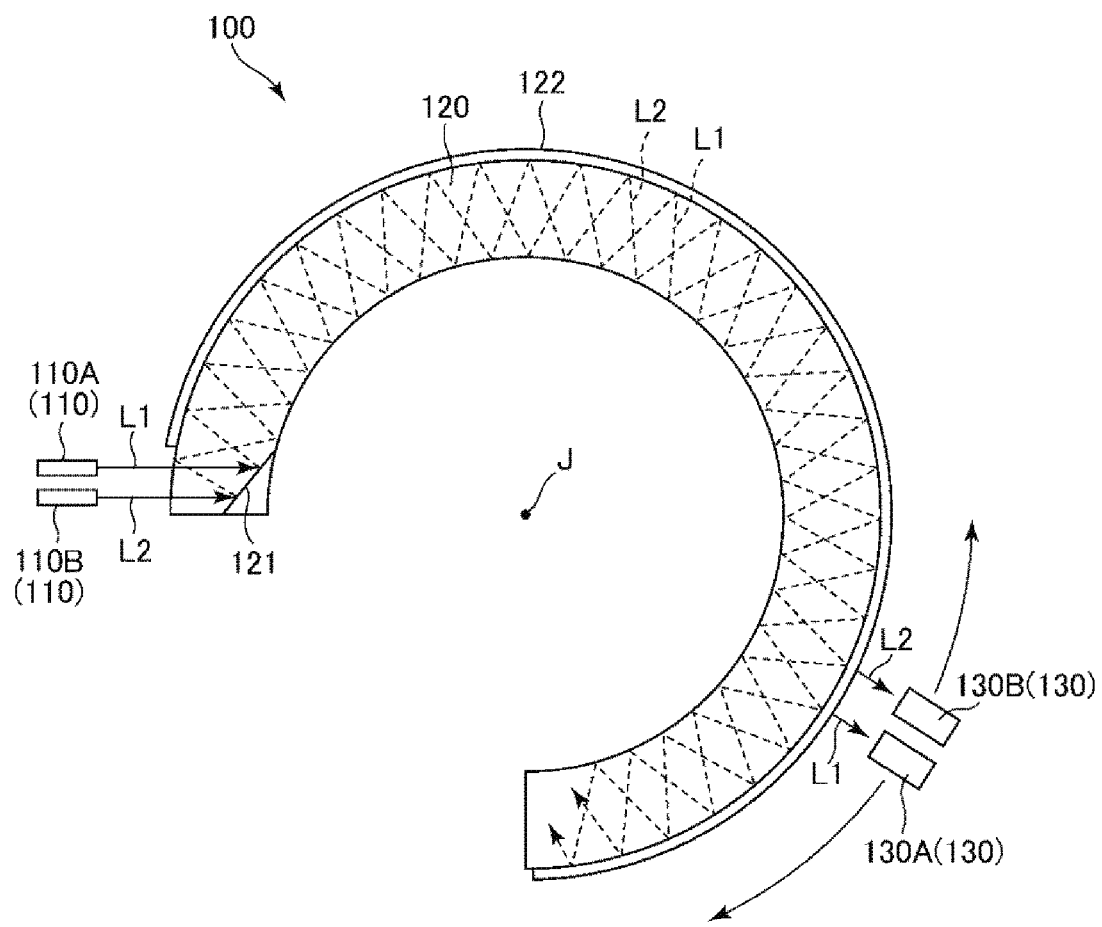
FIG. 7 is a plan view of an optical connection device according to a second embodiment of the invention.

FIG. 7 is a plan view of the optical connection device according to the second embodiment of the invention.

This embodiment is the same as the first embodiment except that a plurality of light source sections and a plurality of light receiving sections are disposed.

Note that, in the following explanation, concerning this embodiment, differences from the first embodiment are mainly explained. Explanation of similarities is omitted. In FIG. 7, components same as the components in the first embodiment are denoted by the same reference numerals and signs.

As shown in FIG. 7, in the optical connection device 100 in this embodiment, a plurality of light source sections 110 and a plurality of light receiving sections 130 are provided. By adopting such a configuration, a plurality of optical signals can be simultaneously transmitted by the light guide section 120. Specifically, the optical connection device 100 includes two light source sections 110A and 110B and two light receiving sections 130A and 130B. The light source section 110A and the light receiving section 130A are paired and the light source section 110B and the light receiving section 130B are paired. That is, light L1 emitted from the light source section 110A is transmitted in the light guide section 120, emitted from the emitting section 122, and received by the light receiving section 130. Light L2 emitted from the light source section 110B is transmitted in the light guide section 120, emitted from the emitting section 122, and received by the light receiving section 130B. The positions of the light source sections 110A and 110B are fixed with respect to the light guide section 120. The light receiving sections 130A and 130B are displaced with respect to the light guide section 120 according to turning of the second member 420. Both of the light source sections 110A and 110B are disposed to be opposed to the incident section 121 disposed at one end portion of the light guide section 120. The lights L1 and L2 emitted from the light source sections 110A and 110B are transmitted toward the same direction in the light guide section 120.

The wavelength of the light L1 emitted from the light source section 110A and the wavelength of the light L2 emitted from the light source section 110B are different. That is, the plurality of light source sections 110A and 110B respectively emit lights having different wavelengths. On the other hand, the plurality of light receiving sections 130A and 130B respectively selectively receive the lights having the different wavelengths. That is, the light receiving section 130A receives only the light L1 of the lights L1 and L2 by using a filter or the like that transmits only light having a predetermined wavelength. Conversely, the light receiving section 130B receives only the light L2 of the lights L1 and L2 by using the filter or the like. With such a configuration, it is possible to simultaneously transmit the lights L1 and L2 in the light guide section 120 and receive the lights L1 and L2 in the light receiving sections 130A and 130B exclusive for the lights L1 and L2. Therefore, the optical communication device 200 can simultaneously receive two optical signals (a signal by the light L1 and a signal by the light L2). Communication speed is markedly improved. The displacement detection device 300 can detect a turning angle of the second member 420 on the basis of the intensity of the light L1 received by the light receiving section 130A and can detect the turning angle of the second member 420 on the basis of the intensity of the light L2 received by the light receiving section 130B. Therefore, detection accuracy of the turning angle of the second member 420 is improved. When two results of the detection are compared and, for example, when the detection results are different from each other beyond an allowable range, it is possible to determine that at least one of the light receiving sections 130A and 130B are broken.

According to the second embodiment explained above, it is possible to exhibit effects same as the effects in the first embodiment. Note that, in this embodiment, the configuration including the two light source sections 110A and 110B and the two light receiving sections 130A and 130B is explained. However, the number of the light source sections and the light receiving sections is not limited to two and may be three or more. As the light source sections, one light source section that emits compound light including the light L1 and the light L2 may be used.

Third Embodiment

An optical connection device according to a third embodiment of the invention is explained.

Figure 8:
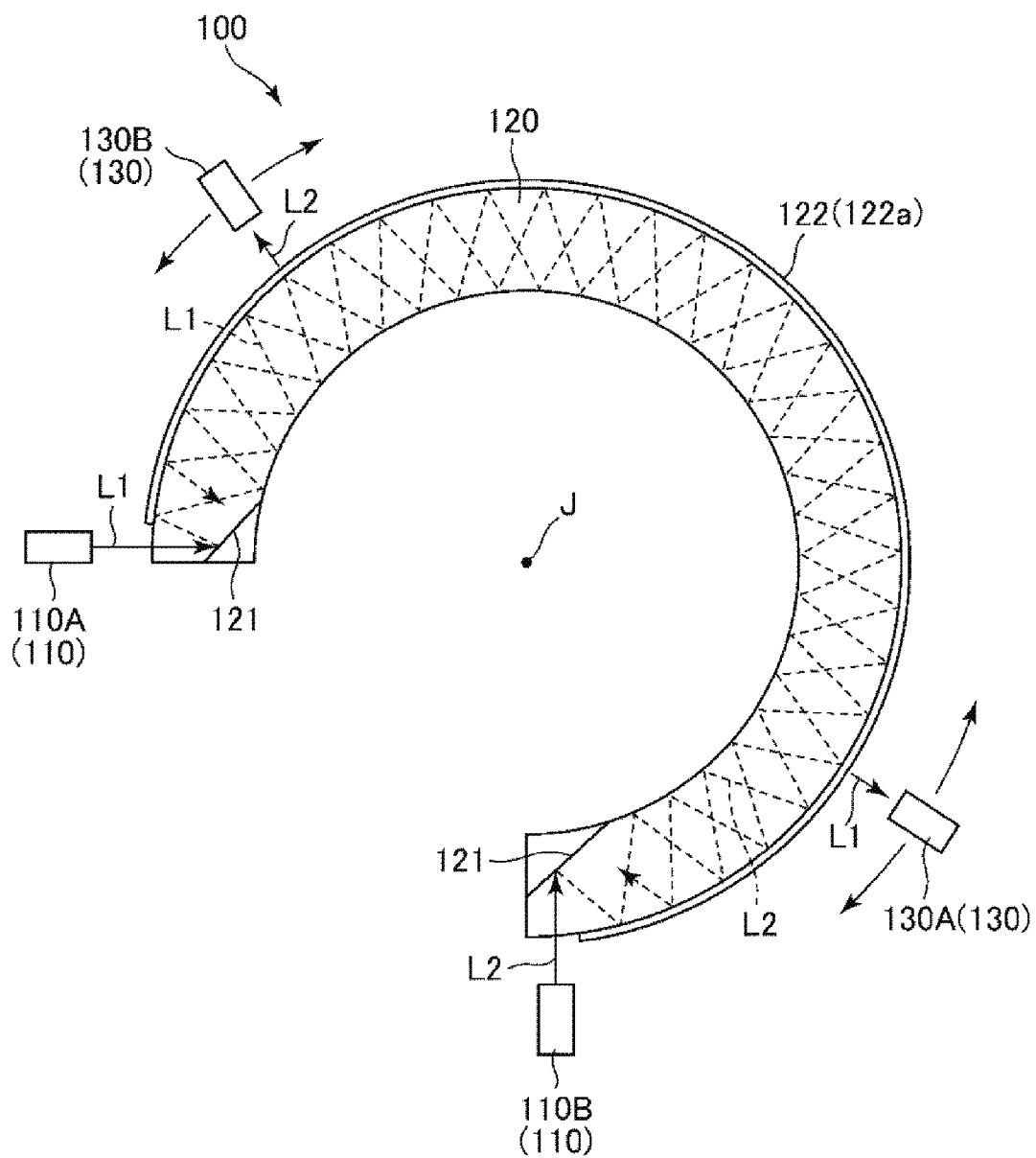
FIG. 8 is a plan view of an optical connection device according to a third embodiment of the invention.

FIG. 8 is a plan view of the optical connection device according to the third embodiment of the invention.

This embodiment is the same as the second embodiment except that disposition of a light source section and a light receiving section is different.

Note that, in the following explanation, concerning this embodiment, differences from the embodiments explained above are mainly explained. Explanation of similarities is omitted. In FIG. 8, components same as the components in the embodiments explained above are denoted by the same reference numerals and signs.

As shown in FIG. 8, in the optical connection device 100 in this embodiment, the incident sections 121 are provided at both end portions of the light guide section 120. The light source section 110A is disposed to be opposed to one incident section 121. The light source section 110B is disposed to be opposed to the other incident section 121. Therefore, a transmission direction in the light guide section 120 of the light L1 emitted from the light source section 110A and a transmission direction in the light guide section 120 of the light L2 emitted from the light source section 110B are opposite. The positions of the light source sections 110A and 110B are fixed with respect to the light guide section 120. On the other hand, the light receiving sections 130A and 130B are displaced with respect to the light guide section 120 according to turning of the second member 420. By adopting such a configuration, the optical communication device 200 is capable of performing bidirectional optical communication.

According to the third embodiment explained above, it is possible to exhibit effects same as the effects in the second embodiment. Note that, in this embodiment, the configuration including the two light source sections 110A and 110B and the two light receiving sections 130A and 130B is explained. However, the number of the light source sections and the light receiving sections is not limited to two and may be three or more.

Fourth Embodiment

A robot according to a fourth embodiment of the invention is explained.

Figure 9:
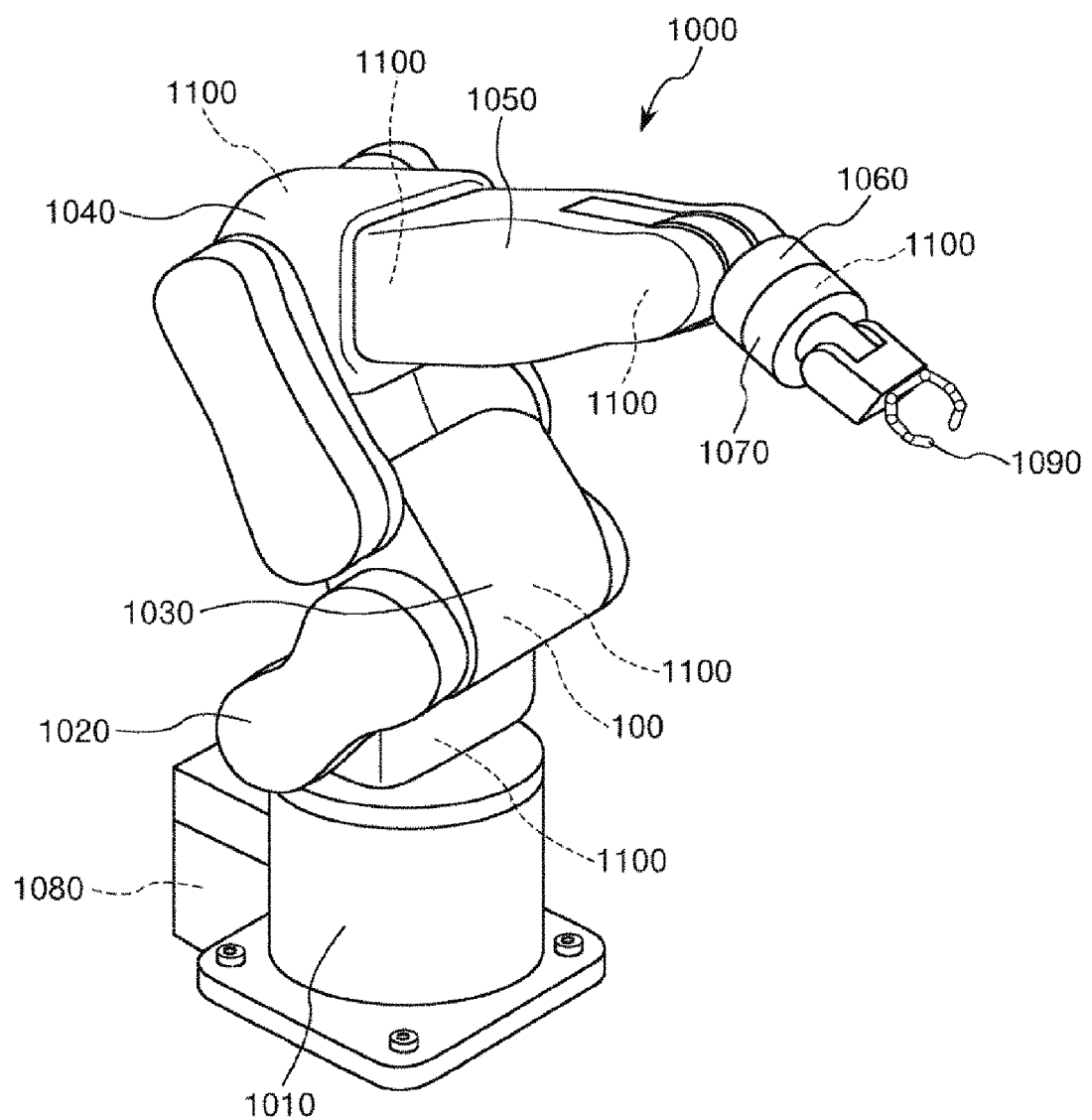
FIG. 9 is a perspective view of a robot according to a fourth embodiment of the invention.
Figure 10:
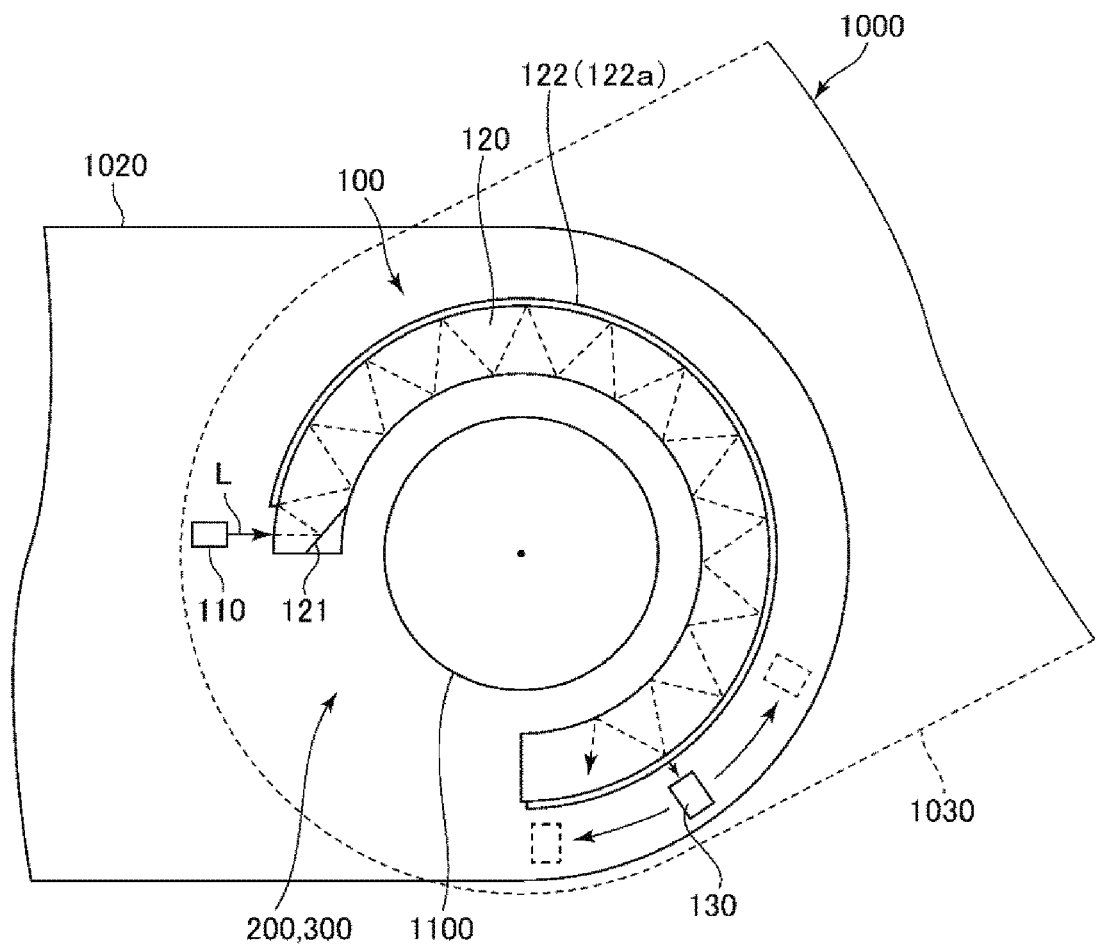
FIG. 10 is a partially enlarged plan view of the robot shown in FIG. 9.
Figure 11:
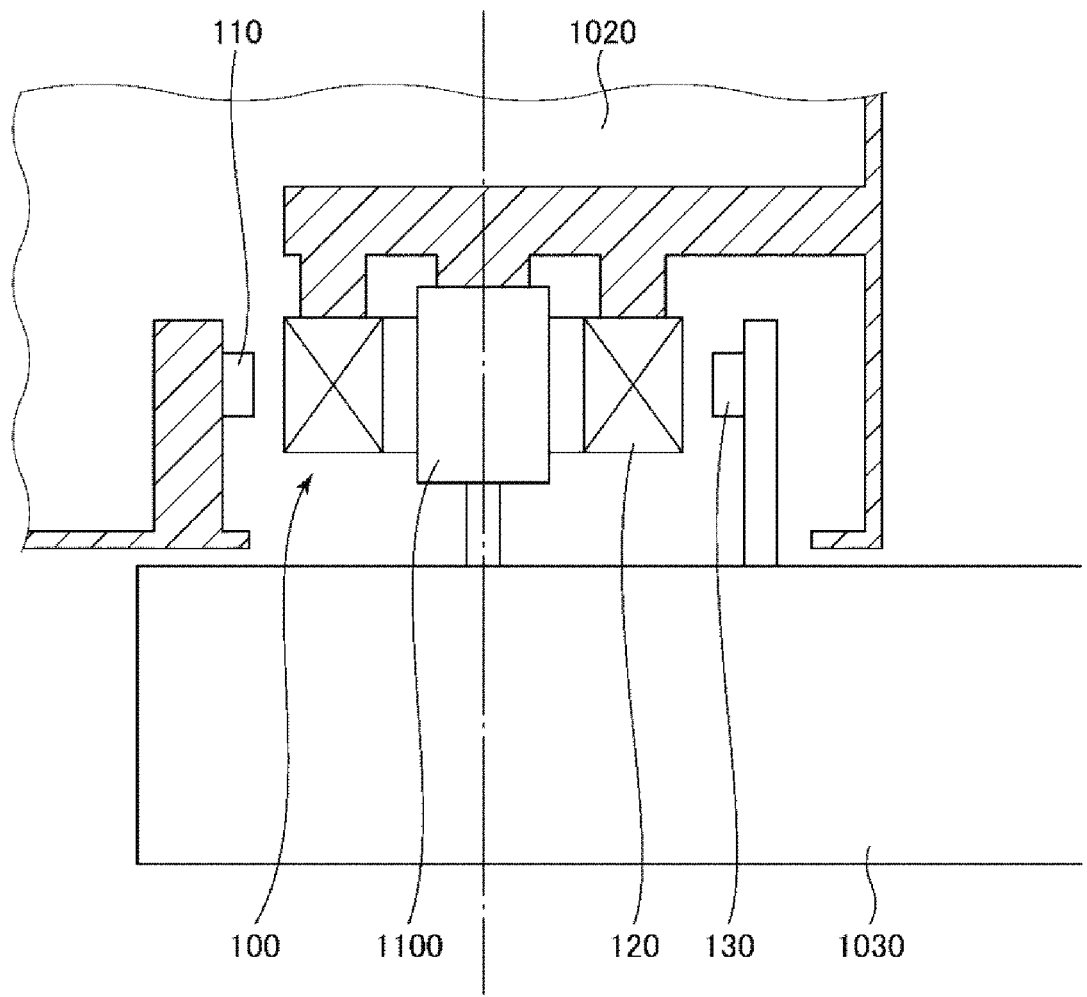
FIG. 11 is a sectional view of the robot shown in FIG. 10.
Figure 12:
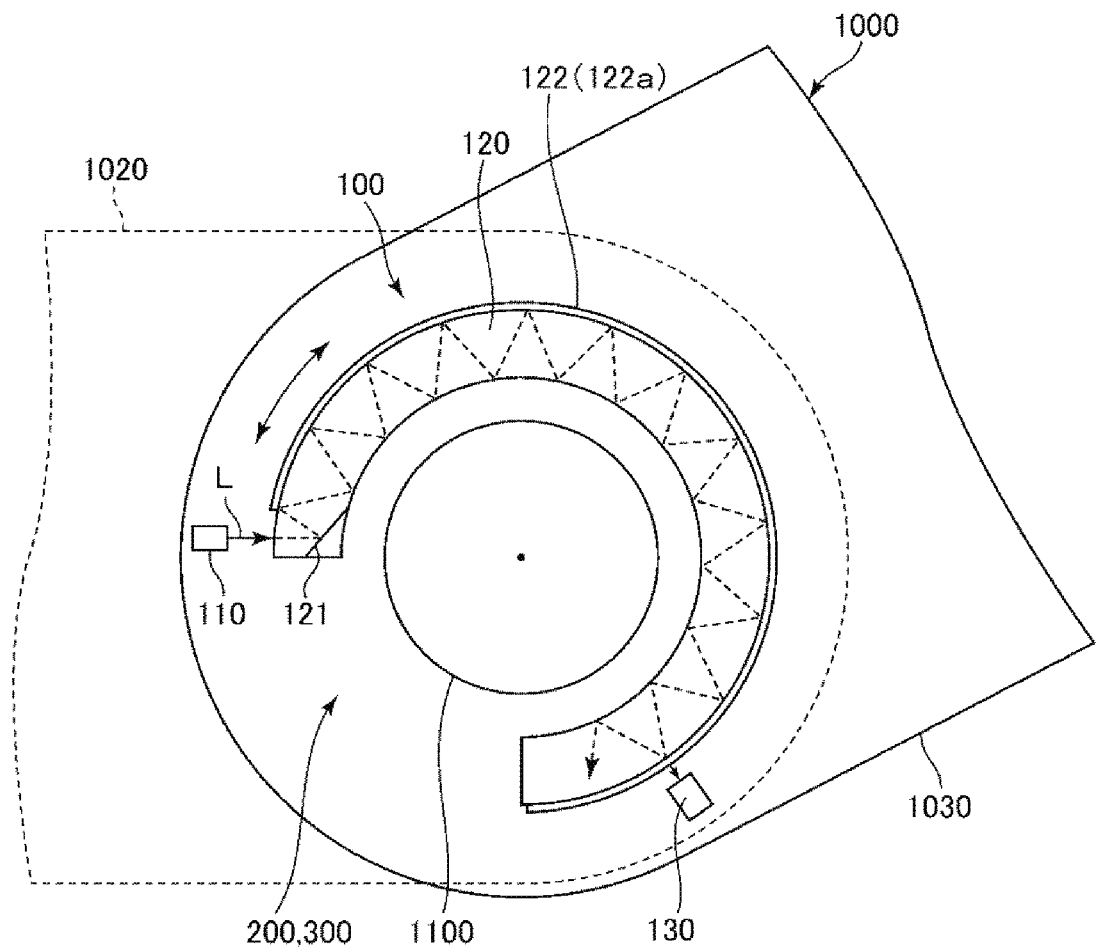
FIG. 12 is a partially enlarged plan view of the robot shown in FIG. 9.
Figure 13:
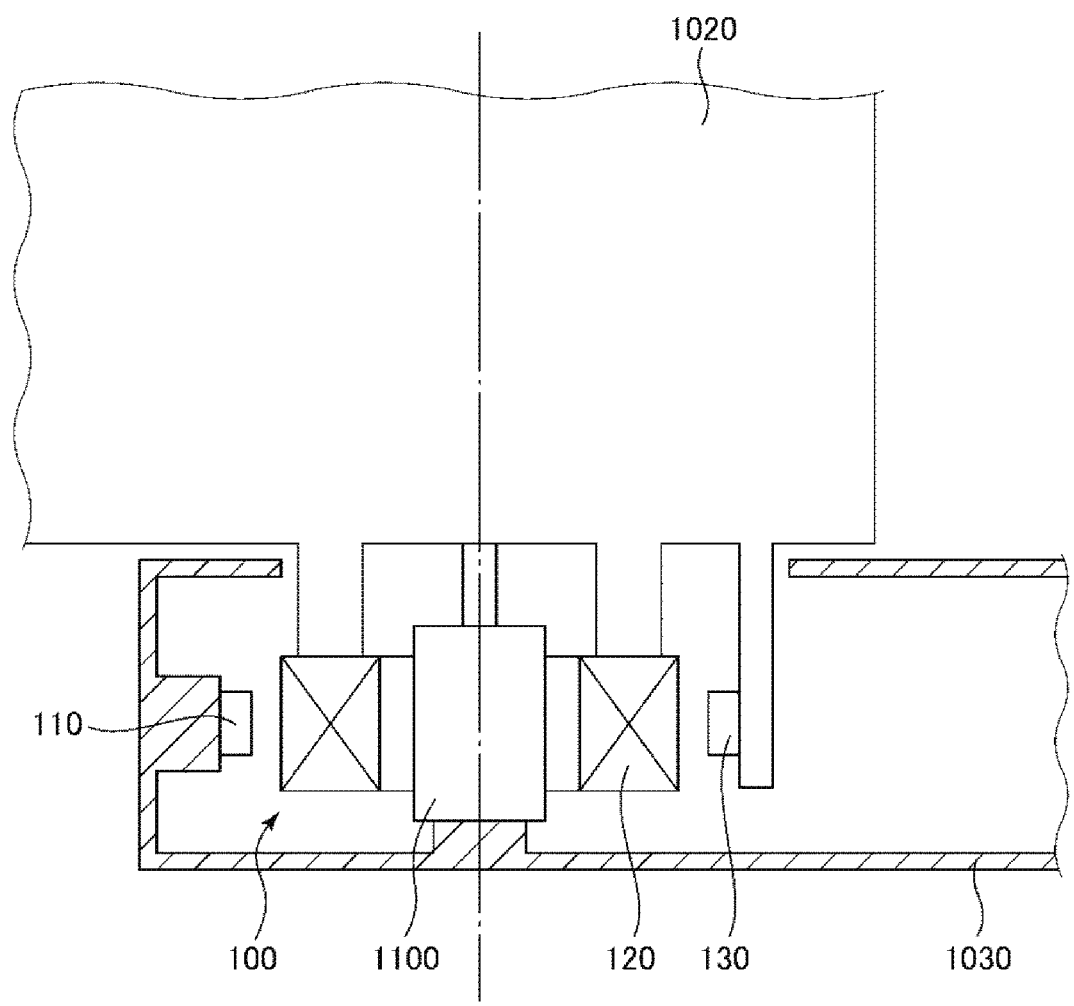
FIG. 13 is a sectional view of the robot shown in FIG. 12.

FIG. 9 is a perspective view of the robot according to the fourth embodiment of the invention. FIG. 10 is a partially enlarged plan view of the robot shown in FIG. 9. FIG. 11 is a sectional view of the robot shown in FIG. 10. FIG. 12 is a partially enlarged plan view of the robot shown in FIG. 9. FIG. 13 is a sectional view of the robot shown in FIG. 12.

A robot 1000 includes an arm 1020 functioning as a first arm, an arm 1030 functioning as a second arm disposed to be capable of turning around a turning axis with respect to the arm 1020, the light source section 110 that has a fixed relative positional relation with one of the arm 1020 and the arm 1030 and emits light, the light guide section 120 that has a fixed relative positional relation with the arm 1020 or the arm 1030, transmits light emitted from the light source section 110, and includes the emitting section 122 that emits the transmitted light to the outside, and the light receiving section 130 that has a fixed relative positional relation with the other of the arm 1020 and the arm 1030 and receives the light emitted from the emitting section 122. The robot 1000 is configured such that the arm 1030 turns with respect to the arm 1020. That is, the robot 1000 includes the optical connection device 100 in a joint portion of the arm 1020 and the arm 1030 and is configured such that a transmission distance of light from the light source section 110 to the light receiving section 130 changes according to the turning of the arm 1030 with respect to the arm 1020. Therefore, the robot 1000 can enjoy the effects of the optical connection device 100, reduce deterioration in flexibility of disposition of various components (in particular, driving sources 1100 explained below), and exhibit high reliability. The robot 1000 is explained in detail below.

The robot 1000 shown in FIG. 9 can perform work such as supply, removal, conveyance, and assembly of a precision instrument and components (target objects) configuring the precision instrument. The robot 1000 is a six-axis robot (multi-joint robot) and is fixed to a floor or a ceiling. The robot 1000 includes a base 1010 functioning as a base section that supports the arm 1020, the arm 1020 functioning as a first arm turnably coupled to the base 1010, the arm 1030 functioning as a second arm turnably coupled to the arm 1020, an arm 1040 turnably coupled to the arm 1030, an arm 1050 turnably coupled to the arm 1040, an arm 1060 turnably coupled to the arm 1050, an arm 1070 turnably coupled to the arm 1060, and a control section 1080 that controls driving of the arms 1020, 1030, 1040, 1050, 1060, and 1070. A hand connecting section is provided in the arm 1070. An end effector 1090 corresponding to work to be executed by the robot 1000 is attached to the hand connecting section. Driving sources 1100, which is, for example, motors are mounted on joint sections. The arms 1020, 1030, 1040, 1050, 1060, and 1070 turn according to driving of the driving sources 1100. Note that the driving of the driving sources 1100 is controlled by the control section 1080.

An example of a connecting section (a joint section) of the arm 1020 and the arm 1030 is explained. As shown in FIG. 10, the driving source 1100 and the optical connection device 100 are disposed in the connecting section (the joint section) of the arm 1020 and the arm 1030. The driving source 1100 is disposed in the arm 1020 and fixed to the arm 1020. The light source section 110, the light guide section 120, and the light receiving section 130 included in the optical connection device 100 are also respectively disposed in the arm 1020 (the first arm). The light source section 110 and the light guide section 120 are fixed to the arm 1020. The light receiving section 130 is fixed to the arm 1030.

In other words, as shown in FIG. 11, the driving source 1100 (a main body section), the light source section 110, the light guide section 120, and the light receiving section 130 are respectively housed in an internal space of the arm 1020. The driving source 1100, the light source section 110, and the light guide section 120 are respectively fixed to the arm 1020 (e.g., the inner wall of the arm 1020). On the other hand, the light receiving section 130 is not fixed to the arm 1020 and is fixed to the arm 1030. Therefore, when the arm 1030 turns with respect to the arm 1020, the light receiving section 130 is displaced around a turning axis of the arm 1030 in the internal space of the arm 1020 according to the turning of the arm 1030.

The light guide section 120 is located around the driving source 1100 and disposed such that the center axis of the light guide section 120 coincides with the turning axis of the arm 1030. Therefore, when the arm 1030 turns with respect to the arm 1020, the light receiving section 130 is displaced with respect to the light guide section 120 according to the turning of the arm 1030. With the robot 1000, since the robot 1000 includes the optical connection device 100, it is possible to perform communication between the arms 1020 and 1030 and detect a turning angle of the arm 1030 while reducing deterioration in flexibility of disposition of the driving source 1100 and disposition of other components. In particular, by disposing the optical connection device 100 in the arm 1020, more specifically, fixing the light guide section 120 to the arm 1020 as in this embodiment, it is possible to reduce the weight of the arm 1030 and more smoothly drive the robot 1000. It is possible to secure a space for housing components other than the optical connection device 100 in the arm 1030.

Note that, in the configuration explained above, the driving source 1100 may be disposed in the arm 1030 and fixed to the arm 1030. Since the optical connection device 100 can be disposed avoiding the rotating shaft of the driving source 1100, it is possible to reduce deterioration in flexibility of disposition of components.

Another example of the connecting section (the joint section) of the arm 1020 and the arm 1030 is explained. As shown in FIG. 12, the driving source 1100 and the optical connection device 100 are disposed in the connecting section (the joint section) of the arm 1020 and the arm 1030. The driving source 1100 is disposed in the arm 1030 and fixed to the arm 1030. The light source section 110, the light guide section 120, and the light receiving section 130 included in the optical connection device 100 are also respectively disposed in the arm 1030 (the second arm). The light source section 110 and the light guide section 120 are fixed to the arm 1030. The light receiving section 130 is fixed to the arm 1020.

In other words, as shown in FIG. 13, the driving source 1100 (the main body section), the light source section 110, the light guide section 120, and the light receiving section 130 are respectively housed in an internal space of the arm 1030. The driving source 1100, the light source section 110, and the light guide section 120 are respectively fixed to the arm 1030 (e.g., the inner wall of the arm 1030). On the other hand, the light receiving section 130 is not fixed to the arm 1030 and is fixed to the arm 1020. Therefore, when the arm 1030 turns with respect to the arm 1020, the light receiving section 130 is displaced around the turning axis of the arm 1030 in the internal space of the arm 1030 according to the turning of the arm 1030.

The light guide section 120 is located around the driving source 1100 and disposed such that the center axis of the light guide section 120 coincides with the turning axis of the arm 1030. Therefore, when the arm 1030 turns with respect to the arm 1020, the light source section 110 and the light guide section 120 are displaced with respect to the light receiving section 130 according to the turning of the arm 1030. With the robot 1000, since the robot 1000 includes the optical connection device 100, it is possible to perform communication between the arms 1020 and 1030 and detect a turning angle of the arm 1030 while reducing deterioration in flexibility of disposition of the driving source 1100 and disposition of other components. In particular, by disposing the optical connection device 100 in the arm 1030, more specifically, fixing the light guide section 120 to the arm 1030 as in this embodiment, it is possible to reduce the weight of the arm 1020. It is possible to secure a space for housing components other than the optical connection device 100 in the arm 1020.

Note that, in the configuration explained above, the driving source 1100 may be disposed in the arm 1020 and fixed to the arm 1020. Since the optical connection device 100 can be disposed avoiding the rotating shaft of the driving source 1100, it is possible to reduce deterioration in flexibility of disposition of components.

The robot according to the fourth embodiment is explained above. Note that, in the configuration explained above, the optical connection device 100 is disposed in the joint portion of the arms 1020 and 1030. Besides, the optical connection device 100 may be disposed in the same manner in a joint portion of the base 1010 and the arm 1020, a joint portion of the arms 1030 and 1040, a joint portion of the arms 1040 and 1050, a joint portion of the arms 1050 and 1060, and a joint portion of the arms 1060 and 1070. In the configuration explained above, the arm 1020 is the first arm and the arm 1030 is the second arm. However, the first arm and the second arm are not limited to this. For example, the arm 1030 may be the first arm and the arm 1040 may be the second arm. The arm 1040 may be the first arm and the arm 1050 may be the second arm. The arm 1050 may be the first arm and the arm 1060 may be the second arm. The arm 1060 may be the first arm and the arm 1070 may be the second arm.

The embodiments of the invention are explained above with reference to the drawings. However, the invention is not limited to the embodiments. The components of the sections can be replaced with any components having the same functions. Any other components may be added to the invention. The embodiments may be combined as appropriate.

The entire disclosures of Japanese Patent Application No. 2016-149426, filed Jul. 29, 2016 and No. 2017-107105, filed May 30, 2017 are expressly incorporated by reference herein.

What is claimed is:
1. An optical connection device comprising:
a first member;
a second member being turnably connected to the first member so that the second member turns around a turning axis with respect to the first member;
a light source fixed to one of the first member or the second member, the light source being configured to emit light;
a light guide to which the light from the light source is incident, the light guide being fixed to one of the first member or the second member, the light guide being configured to guide the light, the light guide including an emitting section configured to emit the guided light to an outside, the light guide including a circumferential section configured to surround the emitting section; and a light receiver fixed to the other of the first member or the second member, the light receiver being configured to receive the guided light emitted from the emitting section, wherein at least one of the light source or the light receiver is configured to turn around the turning axis, the light guide includes a circumferential section configured to surround the emitting section, and a refractive index of the emitting section is smaller than a refractive index of the circumferential section.

2. The optical connection device according to claim 1, wherein the light guide is in an arcuate shape.

3. An optical communication device comprising the optical connection device according to claim 2.

4. A displacement detection device comprising the optical connection device according to claim 2.

5. The optical connection device according to claim 1, wherein the light guide and at least one of the light source or the light receiver are disposed in a plane perpendicular to the turning axis.

6. The optical connection device according to claim 1, wherein surface roughness of the emitting section is larger than surface roughness of the circumferential section.

7. The optical connection device according to claim 1, wherein the light source is configured with a plurality of the light sources, and the light receiver is configured with a plurality of the light receivers.

8. The optical connection device according to claim 7, wherein the plurality of light sources respectively emit lights having different wavelengths.

9. An optical communication device comprising the optical connection device according to claim 1.

10. A displacement detection device comprising the optical connection device according to claim 1.

11. A robot comprising:

a base;

a first arm being supported by the base;

a second arm being turnably connected to the first arm so that the second arm turns around a turning axis with respect to the first arm;

a light source fixed to the first arm, the light source being configured to emit light;

a light guide to which the light from the light source is incident, the light guide being fixed to the first arm, the light guide being configured to guide the light, the light guide including an emitting section configured to emit the guided light to an outside; and a light receiver fixed to the first arm, the light receiver being configured to receive the guided light emitted from the emitting section, wherein at least one of the light source or the light receiver is configured to turn around the turning axis, and the light source, the light guide, and the light receiver are respectively disposed in the first arm.

12. A robot comprising:

a base;

a first arm being supported by the base;

a second arm being turnably connected to the first arm so that the second arm turns around a turning axis with respect to the first arm;

a light source fixed to the second arm, the light source being configured to emit light;

a light guide to which the light from the light source is incident, the light guide being fixed to the second arm, the light guide being configured to guide the light, the light guide including an emitting section configured to emit the guided light to an outside; and a light receiver fixed to the second arm, the light receiver being configured to receive the guided light emitted from the emitting section, wherein at least one of the light source or the light receiver is configured to turn around the turning axis, and the light source, the light guide, and the light receiver are respectively disposed in the second arm.

13. An optical connection device comprising:

a first member;

a second member being turnably connected to the first member so that the second member turns around a turning axis with respect to the first member;

a light source fixed to one of the first member or the second member, the light source being configured to emit light;

a light guide to which the light from the light source is incident, the light guide being fixed to one of the first member or the second member, the light guide being configured to guide the light, the light guide including an emitting section configured to emit the guided light to an outside, the light guide including a circumferential section configured to surround the emitting section; and a light receiver fixed to the other of the first member or the second member, the light receiver being configured to receive the guided light emitted from the emitting section, wherein at least one of the light source or the light receiver is configured to turn around the turning axis, and surface roughness of the emitting section is larger than surface roughness of the circumferential section.

* * * * *